(12) United States Patent
Qiu et al.

(10) Patent No.: US 9,766,264 B2
(45) Date of Patent: *Sep. 19, 2017

(54) ANCHOR-TILT CANCELLING ACCELEROMETER

(71) Applicant: INVENSENSE, INC., San Jose, CA (US)

(72) Inventors: Jin Qiu, Sunnyvale, CA (US); Joe Seeger, Menlo Park, CA (US); Alexander Castro, San Francisco, CA (US); Igor Tchertkov, Pleasanton, CA (US); Richard Li, Mountain View, CA (US)

(73) Assignee: INVENSENSE, INC., San Jose, CA (US)

( * ) Notice: Subject to any disclaimer, the term of this patent is extended or adjusted under 35 U.S.C. 154(b) by 417 days.

This patent is subject to a terminal disclaimer.

(21) Appl. No.: 14/465,304

(22) Filed: Aug. 21, 2014

(65) Prior Publication Data

US 2014/0360268 A1 Dec. 11, 2014

Related U.S. Application Data

(63) Continuation of application No. 13/249,902, filed on Sep. 30, 2011, now Pat. No. 8,839,670.

(60) Provisional application No. 61/416,943, filed on Nov. 24, 2010.

(51) Int. Cl.
*G01P 15/125* (2006.01)
*G01P 21/00* (2006.01)
*G01P 15/02* (2013.01)

(52) U.S. Cl.
CPC ............ *G01P 15/125* (2013.01); *G01P 15/02* (2013.01); *G01P 21/00* (2013.01)

(58) Field of Classification Search
CPC ......... G01P 15/125; G01P 15/02; G01P 21/00
See application file for complete search history.

(56) References Cited

U.S. PATENT DOCUMENTS

| | | | |
|---|---|---|---|
| 6,158,280 A * | 12/2000 | Nonomura | G01C 19/5719 73/504.04 |
| 7,022,543 B2 | 4/2006 | Eskridge et al. | |
| 7,210,352 B2 | 5/2007 | Foster et | |
| 7,487,661 B2 | 2/2009 | Ueda et al. | |
| 7,578,190 B2 | 8/2009 | Lin et al. | |
| 7,600,428 B2 | 10/2009 | Robert et al. | |
| 7,610,809 B2 | 11/2009 | McNeil et al. | |
| 7,863,698 B2 * | 1/2011 | Seeger | B81C 1/00039 257/254 |
| 8,020,443 B2 | 9/2011 | Lin et al. | |
| 8,056,415 B2 | 11/2011 | McNeil et al. | |

(Continued)

*Primary Examiner* — Helen Kwok
(74) *Attorney, Agent, or Firm* — Maryam Imam; Klintworth & Rozenblat IP LLP (57) ABSTRACT

Described herein is an accelerometer that can be sensitive to acceleration, but not anchor motion due to sources other than acceleration. The accelerometer can employ a set of electrodes and/or transducers that can register motion of the proof mass and support structure and employ and output-cancelling mechanism so that the accelerometer can distinguish between acceleration and anchor motion due to sources other than acceleration. For example, the effects of anchor motion can be cancelled from an output signal of the accelerometer so that the accelerometer exhibits sensitivity to only acceleration.

19 Claims, 6 Drawing Sheets

(56) References Cited

U.S. PATENT DOCUMENTS

| | | |
|---|---|---|
| 8,272,268 B2 | 9/2012 | Classen et al. |
| 8,333,113 B2 | 12/2012 | Classen et al. |
| 8,839,670 B2 * | 9/2014 | Qiu .................. G01P 15/125 73/514.32 |
| 2005/0005698 A1 | 1/2005 | McNeil et al. |
| 2009/0241662 A1 | 10/2009 | Supino et al. |
| 2009/0308159 A1 | 12/2009 | Frey et al. |
| 2012/0186346 A1 | 7/2012 | McNeil et al. |

* cited by examiner

ANCHOR-TILT CANCELLING ACCELEROMETER

CROSS REFERENCE TO RELATED APPLICATIONS

This application is a continuation of U.S. application Ser. No. 13/249,902, filed on Sep. 30, 2011, by Jin Qiu, entitled, "ANCHOR-TILT CANCELLING ACCELEROMETER", which claims the priority of and expressly incorporates by reference the following application: U.S. Provisional Patent Application Ser. No. 61/416,943, by Jin Qiu, entitled "ANCHOR-TILT CANCELLING ACCELEROMETER," which was filed on Nov. 24, 2010.

TECHNICAL FIELD

Described herein is an accelerometer that implements an offset cancelling mechanism, which allows the accelerometer to be responsive to acceleration without being responsive to anchor motion.

BACKGROUND

Accelerometers (e.g., X-, Y- or Z-accelerometers) can utilize a proof-mass attached to a mechanical anchor. In the event of acceleration in a direction (e.g., X-, Y- or Z-acceleration), the proof mass can move accordingly, and the electronics can produce an output signal proportional to the acceleration. The mechanical anchors used in such accelerometers can move because of temperature change, packaging stress, material creep, mechanical shock and other reasons. Motion of the anchors will cause motion of the proof mass attached to it, which will generate a false signal that is indistinguishable from the signal caused by acceleration.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The accelerometer (e.g., an X-, Y- or Z-accelerometer) described herein can include a mechanical structure, at least two transducers and/or electrodes, and a signal processing circuit. The mechanical structure can include a substrate, an anchor coupled to the substrate, a support arm rigidly coupled to the anchor, and at least one proof mass flexibly coupled to the support arm. The at least one proof mass moves in response to acceleration.

The accelerometer can have any number of electrodes and/or transducers (e.g. two, four, six, etc.). Two transducers and/or electrodes will be described herein for simplicity of explanation. The first transducer and/or electrode can measure a first distance between a reference area and a first portion of the mechanical structure. The second transducer and/or electrode can measure a second distance between a second reference area and a second portion of the mechanical structure. The signal processing circuit can be coupled to the two transducers and/or electrodes and can produce an output responsive to acceleration and not responsive to anchor motion based on the first distance and the second distance.

The following description and annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Various non-limiting embodiments of accelerometer articles of manufacture, systems, apparatuses and methods presented herein can sense acceleration without the effects of anchor motion. In the following description, numerous specific details are set forth in order to provide a thorough understanding of one or more embodiments. One skilled in the relevant art will recognize, however, that the techniques described herein can be practiced without one or more of the specific details, or with other methods, components, materials, etc., and is not limited by these specific details and examples. In other instances, well-known structures, materials, and/or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The subject application relates to systems, apparatuses and articles of manufacture (e.g., accelerometers) that can sense acceleration without the effects of anchor motion due to sources such as temperature change, packaging stress, material creep, mechanical shock, and the like. The subject application also relates to methods for using such accelerometers.

Conventional accelerometers can be susceptible to erroneous acceleration outputs caused by anchor motion due to these sources because conventional accelerometers are unable to distinguish between signal caused by acceleration and signal caused by anchor motion. Different from conventional structures, the accelerometer described herein can include a mechanical structure disposed in a plane, wherein at least one proof mass can rotate out of the plane in response to acceleration normal to the plane. The accelerometer can include at least two transducers that can measure distances normal to the plane and a signal processor that can output an acceleration signal based on the distances. The acceleration and/or distances can be in any direction with regard to the plane, such as normal to the plane, parallel to the plane or in any other direction with respect to the plane. These configurations allow the accelerometer to detect acceleration without detecting anchor motion.

Figure 1:
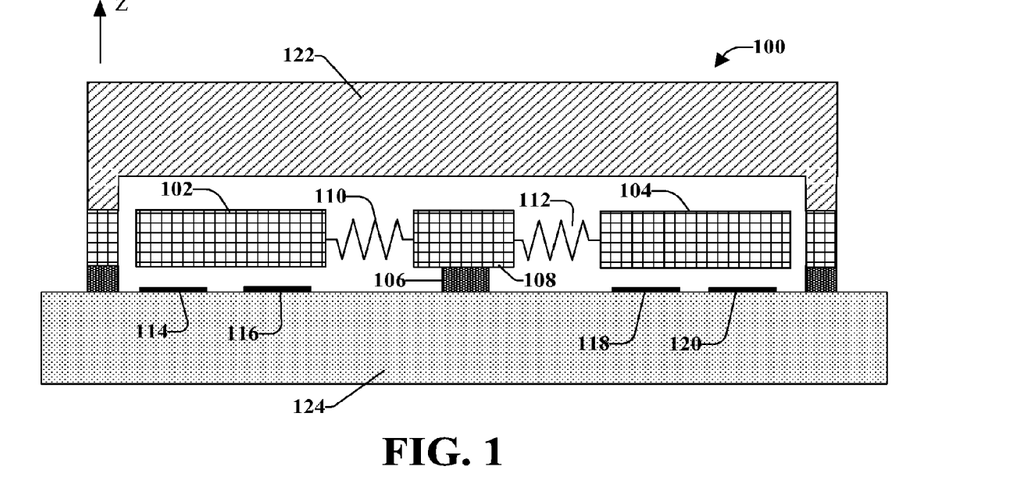
FIG. 1 is a schematic block diagram illustration of a cross section of an example Z accelerometer with two proof masses attached to a bottom substrate not undergoing anchor motion or acceleration.

According to an embodiment as schematically illustrated in FIG. 1, the Z accelerometer 100 employs an offset cancelling mechanism that can overcome the limitation of conventional accelerometers. FIG. 1 is a schematic illustration of a cross section of the Z accelerometer 100 with the Z-direction pointing up. Conventionally in the MEMS art "the Z accelerometer" refers to an accelerometer measuring acceleration substantially perpendicular to a MEMS substrate. The accelerometer 100 can employ a first proof mass 102 and a second proof mass 104 attached to a support structure 108 which is further attached through the mechanical anchor 106 to a bottom substrate 124.

Figure 2:
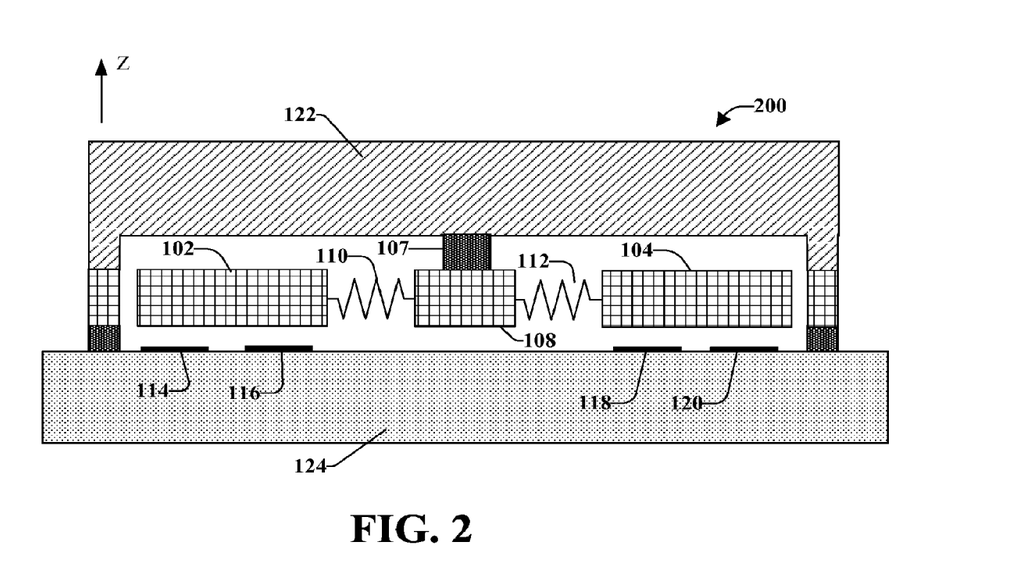
FIG. 2 is a schematic block diagram illustration of a cross section of an example Z accelerometer with two proof masses attached to a top substrate, not undergoing anchor motion or acceleration.
Figure 3:
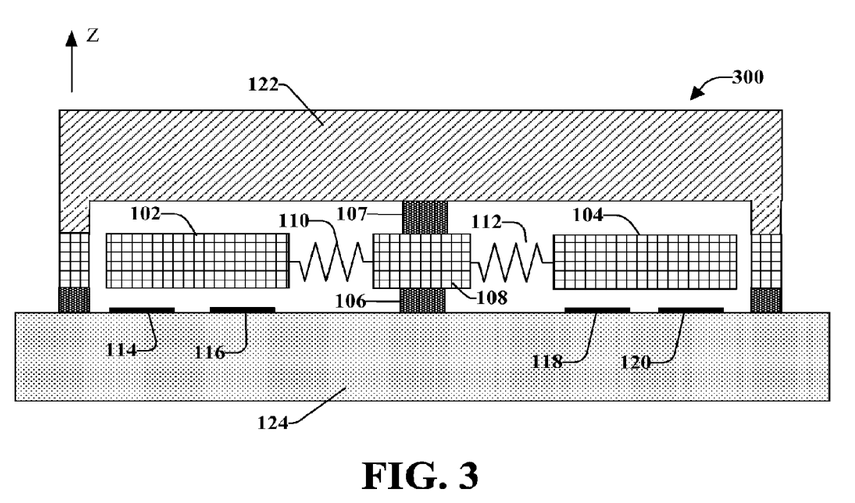
FIG. 3 is a schematic block diagram illustration of a cross section of an example Z accelerometer with two proof masses attached to a top and bottom substrate, not undergoing anchor motion or acceleration.

The first proof mass 102 is attached to the support structure 108 by a first flexible member (e.g., a spring) 110. The second proof mass 104 is attached to the support structure 108 by a second flexible member (e.g., a spring) 112. The support structure 108 can be attached to a bottom substrate 124 through the mechanical anchor 106, as illustrated in FIG. 1. The support structure 108 can also be attached to a top substrate 122, for example by the anchor 107 as illustrated in FIG. 2. Additionally or alternatively, the support structure 108 can be attached to both the top substrate 122 and the bottom substrate 124, for example through anchors 106 and 107, respectively, as illustrated in FIG. 3.

Referring back to FIG. 1, capacitor $C_1$ is formed between the proof mass 102 and a first set of fixed electrodes 114. Similarly, capacitor $C_2$ is formed between the proof mass 102 and a second set of fixed electrodes 116; capacitor $C_3$ is formed between the proof mass 104 and a third set of fixed electrodes 118; capacitor $C_4$ is formed between the proof mass 104 and a fourth set of fixed electrodes 120. The capacitance of each capacitor depends on the distance between the corresponding fixed electrode and the corresponding portion of the proof-mass. The corresponding capacitance changes due to motion of the corresponding proof-mass caused by acceleration or anchor motion, for example.

Although "electrodes" are utilized herein, electrodes are used as an example to facilitate understanding the output cancelling mechanism. The example capacitive electrodes are not intended to be limiting. A person having skill in the art would understand that different types of transducers could be employed in the place of the capacitive electrodes (e.g., piezoelectric transducers or piezoresistors). Additionally or alternatively, a person having ordinary skill in the art would understand that the "electrodes" need not be electrodes at all. Optical transducers, for example, can be employed to measure deflections of the proof mass.

Signals associated with capacitors $C_1$, $C_2$, $C_3$ and $C_4$ are input into electronics (not shown). According to an embodiment, the electronics can include a signal processor. According to an embodiment, the output signal is a linear combination of signals $S_1$, $S_2$, $S_3$ and $S_4$ that are associated with capacitors $C_1$, $C_2$, $C_3$ and $C_4$. For example, the output signal ($S_{output}$) can be:

$$S_{output} = (S_1 - S_2) - (S_3 - S_4),$$

where $S_1$, $S_2$, $S_3$, and $S_4$ depend on the associated capacitance and a gain factor associated with respective capacitors, such that:

$$S_{output} = (a_1 * C_1 - a_2 * C_2) - (a_3 * C_3 - a_4 * C_4),$$

where $a_1$, $a_2$, $a_3$, $a_4$ are gain factors associated with each capacitor.

In the case of no acceleration and no anchor motion, all signals $S_1$, $S_2$, $S_3$ and $S_4$ have the same magnitude, for example:

$$S_1=S_2=S_3=S_4=S_0$$

Accordingly, in the example case of no anchor motion and no acceleration the output signal is:

$$S_{output}=(S_0-S_0)-(S_0-S_0)=0$$

Figure 4:
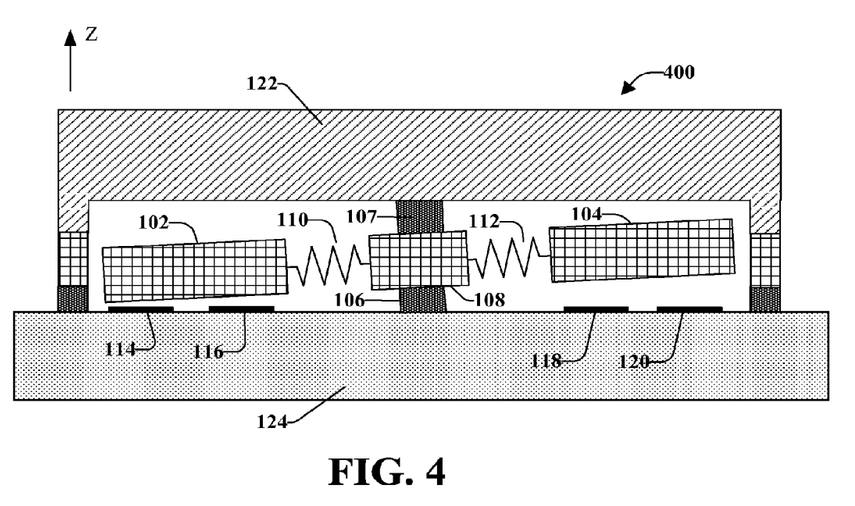
FIG. 4 is a schematic block diagram illustration of a cross section of an example Z accelerometer with two proof masses attached to a top and bottom substrate undergoing anchor motion.

Unlike traditional accelerometers, accelerometer 100 can distinguish between acceleration and anchor motion. FIG. 4 is a schematic illustration of the accelerometer undergoing anchor motion 400.

When the accelerometer experiences anchor motion 400 due to sources such as temperature change, packaging stress, material creep, mechanical shock, and the like, the first proof mass 102 and the second mass 104 experience equal deflections in the opposite directions. Because the capacitances of $C_1$, $C_2$, $C_3$ and $C_4$ depend on the distance between the corresponding fixed electrode and the corresponding proof mass, the capacitances of $C_1$ and $C_2$ increase, while the capacitances of $C_3$ and $C_4$ decrease. As a non-limiting illustration, the change in the outer capacitors' signals can be defined as twice the change in the inner capacitors signals: $S_1=S_0+2\Delta$, $S_2=S_0+\Delta$, $S_3=S_0-\Delta$, and $S_4=S_0-2\Delta$, where $\Delta$ is the change in inner capacitors signals due to corresponding change in distance. In other words, according to the embodiment, the change in $S_1$ is equal and opposite to the change in $S_4$; and the change in $S_2$ is equal and opposite to the change in $S_3$. Accordingly, for the example case of anchor motion without acceleration:

$$S_{output}=(S_1-S_2)-(S_3-S_4)=(S_0+2\Delta-S_0-\Delta)-(S_0-\Delta-S_0+2\Delta)=0$$

The output signal is zero, indicating that accelerometer is insensitive to the anchor motion.

The accelerometer 100 has a capacitive output of zero when exposed to anchor motion, but the accelerometer 100 has a non-zero capacitive output proportional to acceleration when the accelerometer is exposed to acceleration.

Figure 5:
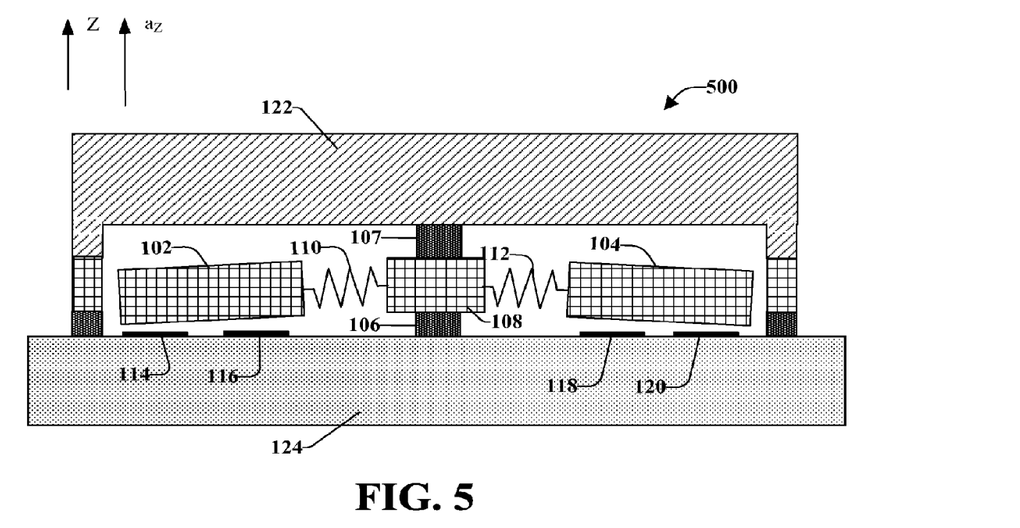
FIG. 5 is a schematic block diagram illustration of a cross section of an example Z accelerometer with two proof masses attached to a top and bottom substrate undergoing acceleration.

FIG. 5 illustrates an accelerometer undergoing acceleration 500 along a Z direction. When subjected to this acceleration, the first proof mass 102 and the second proof mass 104 can independently move in the same direction. The distances between the fixed electrodes 114-120 and the corresponding portion of proof mass 102 and proof mass 104 can change accordingly and generate capacitive signals proportional to the acceleration 500. Specifically, while values of capacitance measured by all the capacitors increase, values of capacitance measured by the outer capacitors $C_1$ and $C_4$ increase more than values of capacitance measured by the inner capacitors $C_2$ and $C_3$.

As a non-limiting illustration, the change in the signals associated with the outer capacitors can be defined as twice the change in the signals associated with the inner capacitors: $S_1=S_0+2\Delta$, $S_2=S_0+\Delta$, $S_3=S_0+\Delta$ and $S_4=S_0+2\Delta$.

The electronics (e.g., signal processor) can produce an output signal that is proportional to acceleration. According to an embodiment, the output signal is the same linear combination of the $S_1$, $S_2$, $S_3$ and $S_4$ described previously. Accordingly, for the case of acceleration 500:

$$S_{output}=(S_1-S_2)-(S_3-S_4)=(S_0+2\Delta-S_0-\Delta)-(S_0+\Delta-S_0-2\Delta)=2\Delta.$$

The capacitive output signal $S_{output}$ changes, and the change in $S_{output}$ indicates acceleration.

Figure 6:
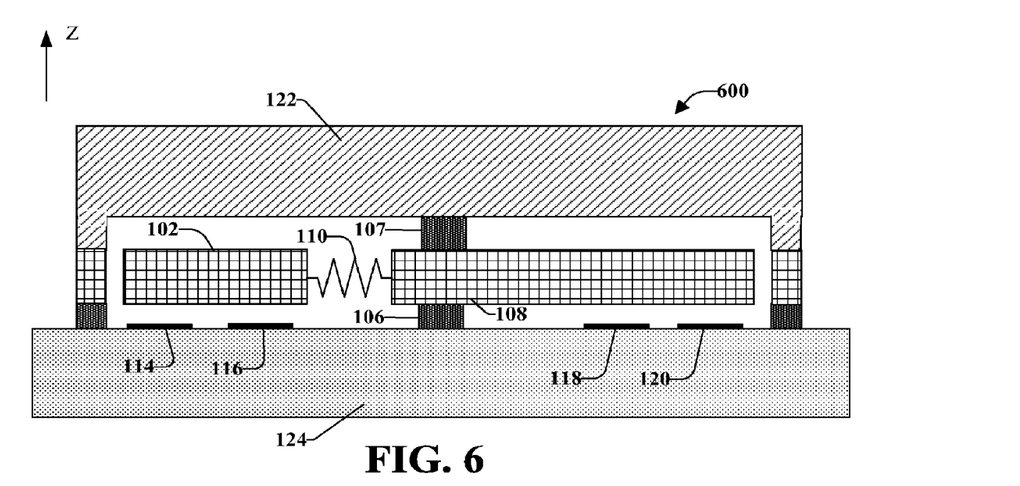
FIG. 6 is a schematic block diagram illustration of a cross section of an example Z accelerometer attached to a top and bottom substrate with a proof mass and a support structure not undergoing anchor motion or acceleration.

FIG. 6 illustrates a schematic illustration of another embodiment of an accelerometer 600 that also employs an offset cancelling mechanism. More specifically, FIG. 6 is a schematic illustration of a cross section of a Z-axis accelerometer with the Z-direction pointing up.

The accelerometer 600 can achieve employ a proof mass 102 and a support structure 108 attached to the mechanical anchors 106 and 107. The proof mass 102 is attached to the support structure 108 by a flexible member (e.g., a spring) 110. According to an embodiment, the mechanical anchor 106 can be attached to a bottom substrate 124 (like the accelerometer illustrated in FIG. 1). According to another embodiment, the mechanical anchor 107 can be attached to a top substrate 122 (like the accelerometer illustrated in FIG. 2). The support structure 108 can also be attached to both the top substrate 122 and the bottom substrate 112, according to another embodiment (like the accelerometer illustrated in FIG. 3).

Capacitor $C_1$ is formed between the proof mass 102 and a first set of fixed electrodes 114. Similarly, capacitor $C_2$ is formed between the proof mass 102 and a second set of fixed electrodes 116; capacitor $C_3$ is formed between the support structure 108 and a third set of fixed electrodes 118; capacitor $C_4$ is formed between support structure 108 and a fourth set of fixed electrodes 120. The capacitance of each capacitor depends on the distance between the corresponding fixed electrode and the corresponding portion of the proof-mass 102 or the corresponding portion of the support arm 108. The capacitance of $C_1$ and $C_2$ changes due to motion of the proof-mass caused by acceleration or anchor motion, for example. The capacitance of $C_3$ and $C_4$ changes due to motion of the support arm caused by anchor motion, for example.

Signals associated with $C_1$, $C_2$, $C_3$ and $C_4$ are input into electronics (not shown). According to an embodiment, the electronics can include a signal processor. According to an embodiment, the output signal ($S_{output}$) is a linear combination of $C_1$, $C_2$, $C_3$ and $C_4$. For example, the output signal ($S_{output}$) can be:

$$S_{output}=(S_1-S_2)-(S_3-S_4),$$

where $S_1$, $S_2$, $S_3$, and $S_4$ depend on the associated capacitance and a gain factor associated with respective capacitors, such that:

$$S_{output}=(a_1*C_1-a_2*C_2)-(a_3*C_3-a_4*C_4),$$

where $a_1$, $a_2$, $a_3$, $a_4$ are gain factors associated with each capacitor.

In the case of no acceleration and no anchor motion, all signals $S_1$, $S_2$, $S_3$ and $S_4$ have the same magnitude, for example:

$$S_1=S_2=S_3=S_4=S_0$$

Accordingly, in the example case of no anchor motion and no acceleration:

$$S_{output}=(S_1-S_2)-(S_3-S_4)=S_0-S_0-S_0+S_0=0$$

Figure 7:
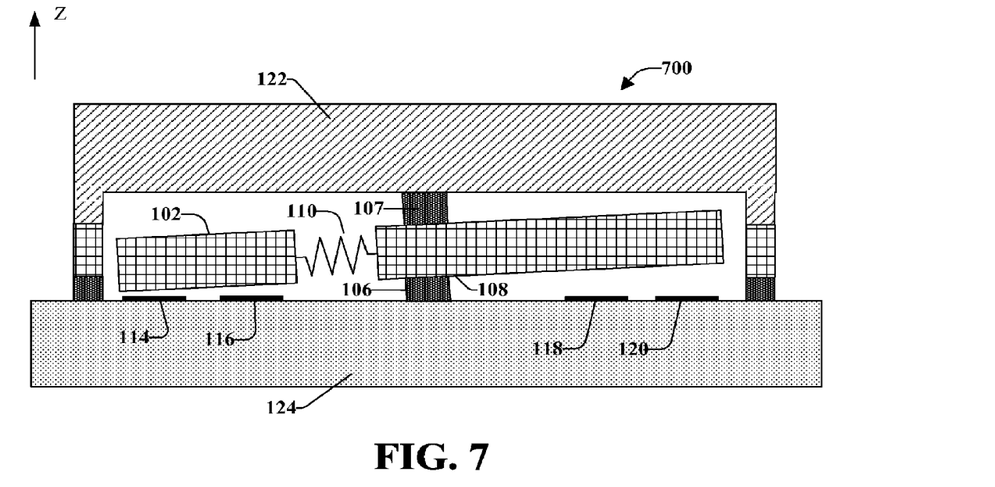
FIG. 7 is a schematic block diagram illustration of a cross section of an example Z accelerometer with a proof mass and a support structure attached to a top and bottom substrate undergoing anchor motion.

Accelerometer 600 can distinguish between acceleration and anchor motion. FIG. 7 is a schematic illustration of the accelerometer undergoing anchor motion 700. According to one embodiment, when the accelerometer experiences anchor motion, the proof mass 102 and the support structure 108 each experience a deflection of the same magnitude but in opposite directions. The values of capacitance measured by capacitors $C_1$ and $C_2$ depend on the distances between the corresponding electrodes and the corresponding portions of proof mass 102. The values of capacitance measured by capacitors $C_3$ and $C_4$ depend on the distances between the corresponding electrodes and the corresponding portion of support structure 108. Therefore, signals $S_1$ and $S_2$ increase, while signals $S_3$ and $S_4$ decrease. Signals $S_1$ and $S_4$ change by the same amount but in opposite directions. Similarly signals $S_2$ and $S_3$ also change by the same amount but in opposite direction. Since the proof mass 102 and the support structure 108 experience rotation, the outer capacitors $C_1$ and $C_4$ generally change more than the inner capacitors $C_2$ and $C_3$. As a non-limiting illustration, the change in the outer capacitors signals can be defined as twice the change in the inner capacitors signals:

$$S_1=S_0+2\Delta, S_2=S_0+\Delta, S_3=S_0-\Delta, \text{ and } S_4=S_0-2\Delta.$$

According to an embodiment, the output capacitive signal is the linear combination of the capacitances $C_1$, $C_2$, $C_3$ and $C_4$. For example, the output signal $S_{output}$ can be of the form:

$$S_{output}=(S_1-S_2)-(S_3-S_4).$$

Accordingly, for the case of anchor motion without acceleration:

$$S_{output}=(S_0+2\Delta-S_0-\Delta)-(S_0-\Delta-S_0+2\Delta)=0.$$

The output of the accelerometer is zero, which indicates that the device is insensitive to the anchor motion.

The accelerometer 600 has a capacitive output of zero when exposed to anchor motion due to sources other than acceleration, but the accelerometer 600 has a non-zero capacitive output proportional to acceleration when exposed to acceleration.

Figure 8:
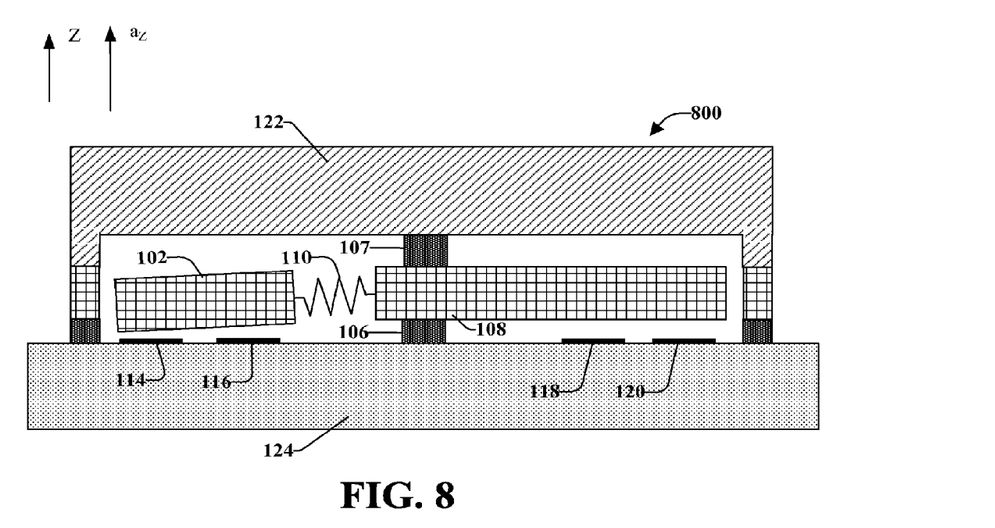
FIG. 8 is a schematic block diagram illustration of a cross section of an example Z accelerometer with a proof mass and a support structure attached to a top and bottom substrate undergoing acceleration.

FIG. 8 illustrates an accelerometer undergoing acceleration 800 along Z direction. When subjected to acceleration, the proof mass 102 independently moves because it is flexibly attached to the support structure, but the support structure 108 does not move because it's rigidly attached to the anchor. The distances between the fixed electrodes 114 and 116 and the corresponding portion of proof mass 102 can change accordingly and generate capacitive signals proportional to the acceleration. Specifically, in case of positive Z acceleration both capacitances $C_1$ and $C_2$ increase, while capacitances $C_3$ and $C_4$ remain the same.

Accordingly, as a non-limiting example, change in $S_1$ signal can be made twice as large as change in $S_2$ signal; therefore: $S_1=S_0+2\Delta$ and $S_2=S_0+\Delta$. The support structure 108 does not experience deflection, therefore $S_3=S_0$, and $S_4=S_0$.

The electronics (e.g., signal processor) can produce an output signal that is proportional to acceleration. According to an embodiment, the output signal is the linear combination of the capacitances $C_1$, $C_2$, $C_3$ and $C_4$. For example, the output capacitive signal $S_{output}$ can be of the form used previously while illustrating anchor motion case. Accordingly, for the case of acceleration:

$$S_{output}=(S_1-S_2)-(S_3-S_4)=(S_0+2\Delta-S_0-\Delta)-(S_0-S_0)=\Delta.$$

The output signal $S_{output}$ changes indicating acceleration.

Although FIGS. 1-8 illustrate an accelerometer that detects acceleration in the Z-direction, the same principles can be applied to create an accelerometer that senses acceleration in an X- and/or a Y-direction. Conventionally in the MEMS art, "X- and Y-accelerometer" refer to the device measuring acceleration parallel to the plane of the device.

Figure 9:
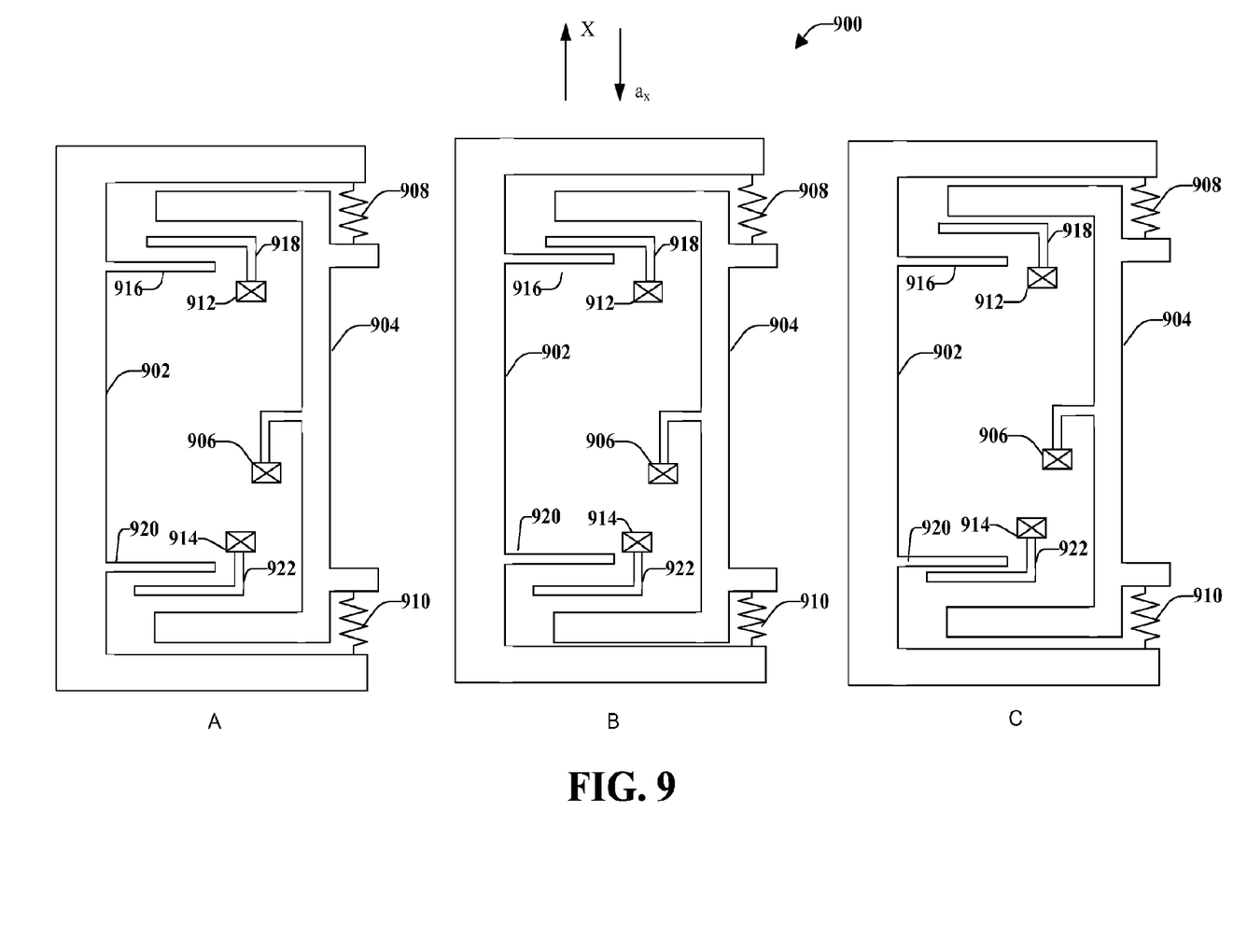
FIG. 9 is a schematic block diagram illustration of a cross section of an example accelerometer implemented as an X- or Y-accelerometer: (A) undisturbed; (B) undergoing acceleration; (C) undergoing anchor motion

FIG. 9 is a schematic illustration of an accelerometer 900 implemented as an X-axis accelerometer with an offset cancelling mechanism, according to an embodiment. The accelerometer 900 can employ a proof mass 902 and a support structure 904. The accelerometer 900 can also include a first fixed electrode 918 attached to a first anchor 912 and a second fixed electrode 922 attached to a second anchor 914. The support structure 904 is attached to a third anchor 906. The proof mass 902 can be flexibly attached to the support structure 904 through springs 908 and 910.

According to an embodiment, the accelerometer can comprise four capacitors: a first capacitor $C_1$ is formed between a portion of support structure 904 and fixed electrode 918; a second capacitor $C_2$ is formed between proof-mass electrode 916 and fixed electrode 918; a third capacitor $C_3$ is formed between proof-mass electrode 920 and fixed electrode 922, and a fourth capacitor $C_4$ is formed between a portion of support structure 904 and fixed electrode 922. FIG. 9A illustrates the case of no acceleration and no anchor motion. In this case signals $S_1$, $S_2$, $S_3$ and $S_4$ associated with capacitors $C_1$, $C_2$, $C_3$ and $C_4$ can be made equal, for example:

$$S_1=S_2=S_3=S_4=S_0$$

According to the embodiment, the output capacitive signal is the linear combination of the capacitances $C_1$, $C_2$, $C_3$ and $C_4$. For example, the output capacitive signal $S_{output}$ can be of the form:

$$S_{output}=(S_1+S_2)-(S_3+S_4)$$

Therefore, in the example case of no acceleration and no anchor motion:

$$S_{output}=(S_1+S_2)-(S_3+S_4)=(S_0+S_0)-(S_0+S_0)=0.$$

The accelerometer 900 is sensitive to acceleration in the X-direction. As illustrated in FIG. 9B, in the event of X-axis acceleration acting along the negative X direction, the proof mass 902, which is flexibly attached to the support structure 904, moves in the positive X direction. In contrast, the support structure itself is rigidly attached to the anchor 906, and therefore doesn't move under acceleration. As a result, the capacitances $C_1$ and $C_4$ don't change, so the signals associated with capacitor $C_1$ and $C_4$ are $S_1=S_0$ and $S_4=S_0$; capacitor $C_2$ decreases, while capacitor $C_3$ increases. According to the embodiment the associated capacitive signals $S_2$ and $S_4$ change by the same amount $\Delta$, but in opposite directions. The output signal ($S_{output}$) can be a linear combination of capacitances $C_1$, $C_2$, $C_3$ and $C_4$:

$$S_{output}=(S_1+S_2)-(S_3+S_4)=(S_0+S_0+\Delta)-(S_0-\Delta+S_0)=2\Delta.$$

The output capacitance signal $S_{output}$ changes, which indicates acceleration.

The accelerometer 900 is insensitive to anchor motion due to sources other than acceleration. FIG. 9C illustrates motion of the anchors 912 and 914 in the positive X direction. As a result the capacitances of $C_1$ and $C_3$ increase, while the capacitances of $C_2$ and $C_4$ decrease. The output signal ($S_{output}$) is the linear combination presented in the example case of acceleration:

$$S_{output}=(S_1+S_2)-(S_3+S_4)$$

According to the embodiment, the changes in the capacitive signal $S_1$ and $S_3$ are equal but opposite in signs; similarly, the changes in the capacitive signal $S_2$ and $S_4$ are equal and opposite in sign, so that $$S_{output}=(S_0+\Delta+S_0-\Delta)-(S_0+\Delta+S_0-\Delta)=0.$$

As shown, the output capacitive signal, $S_{output}$, does not change under anchor motion from sources other than acceleration. This indicates that accelerometer 900 is insensitive to anchor motion.

FIG. 9C also illustrates case of anchor motion in the negative X direction due to sources other than acceleration. The accelerometer is similarly insensitive to such anchor motion due to sources other than acceleration.

Figure 10:
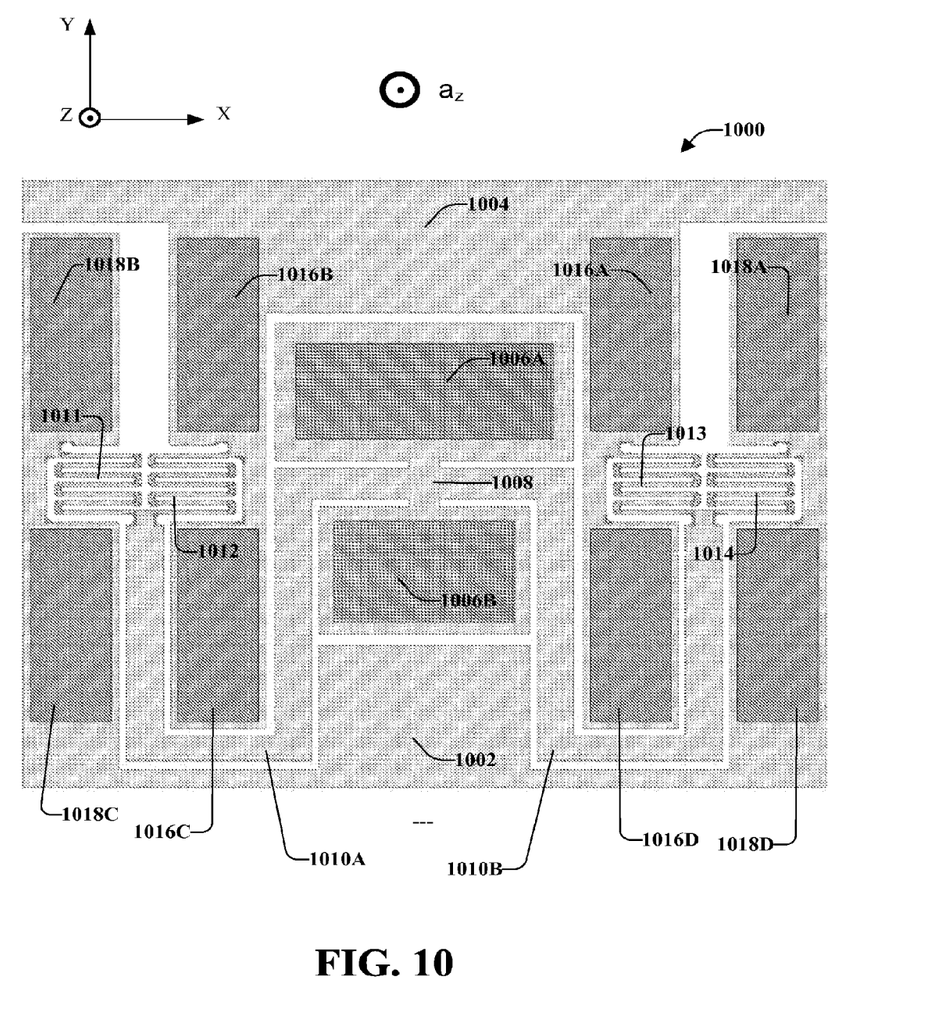
FIG. 10 is a schematic illustration of an exemplary embodiment of a Z accelerometer as a MicroElectroMechanical system (MEMS) device.

FIG. 10 is a schematic illustration of an exemplary embodiment of a Z-axis accelerometer as a microelectromechanical system (MEMS) 1000. The accelerometer 1000 can include an offset cancelling mechanism as described above.

The accelerometer can include two proof masses: a proof mass 1002 and a proof mass 1004. The proof mass 1002 and the proof mass 1004 can be attached to two anchors 1006A and 1006B. According to an embodiment, between the two anchors 1006A and 1006B is a single point connection 1008 to which two support structures 1010A and 1010B are attached. According to an embodiment, the MEMS device 1000 can include four springs 1011, 1012, 1013 and 1014. Each support structure 1010a and 1010b loops around the lower half of the proof mass 1004 and connects to the corresponding springs 1011-1014.

An inner pair of springs 1012 and 1013 can carry the proof mass 1004. An outer pair of springs 1011 and 1014 can carry the proof mass 1002. Proof mass legs, the vertical part of the proof mass, are balanced with regard to the springs. Proof mass heads, horizontal parts of the proof masses, are attached to the legs to make each proof mass un-balanced and create torques acting in case of Z-direction acceleration. The said torques would cause rotation of the proof masses, such that proof mass heads are either moving towards or away from the substrate. This concept is illustrated in FIG. 5.

Underneath the proof-mass legs, fixed electrodes 1016A-D and 1018A-D are arranged to measure the proof mass motion. There are eight capacitors in the embodiment illustrated in FIG. 10: capacitor $C_1$ is formed between fixed electrode 1016A and the proof mass 1004; capacitor $C_2$ is formed between fixed electrode 1016B and the proof mass 1004; capacitor $C_3$ is formed between fixed electrode 1016C and the proof mass 1004; capacitor $C_4$ is formed between fixed electrode 1016D and the proof mass 1004; capacitor $C_5$ is formed between fixed electrode 1018A and the proof mass 1002; capacitor $C_6$ is formed between fixed electrode 1018B and the proof mass 1002; capacitor $C_7$ is formed between fixed electrode 1018C and the proof mass 1002; capacitor $C_8$ is formed between fixed electrode 1018D and the proof mass 1002. The capacitance of each capacitor depends on the distance between the corresponding fixed electrode and the corresponding portion of the proof-mass. The corresponding capacitance changes due to motion of the corresponding proof-mass caused by acceleration or anchor motion, for example.

Signals associated with each capacitor $C_1$-$C_8$ are input into electronics, such as a signal processor (not shown). According to an embodiment, the output capacitive signal is a linear combination of the capacitances $C_1$-$C_8$. For example, the output capacitive signal $S_{output}$ can be:

$$S_{output}=(S_1-S_4)+(S_2-S_3)+(S_8-S_5)+(S_7-S_6),$$

where signals $S_1$-$S_8$ depend on the associated capacitance and a gain factor associated with respective capacitors.

In the case of no acceleration and no anchor motion, all capacitive signals $S_1$-$S_8$ are equal, for example:

$$S_1=S_2=S_3=S_4=S_5=S_6=S_7=S_8=S_0$$

In case of acceleration along the positive Z direction both proof mass 1002 and 1004 deflect towards the substrate. The capacitance values of $C_1$-$C_8$ are determined by the corresponding distances between the corresponding proof masses and the corresponding fixed electrodes. Therefore, capacitances of $C_1$, $C_2$, $C_7$, and $C_8$ increase, and capacitances of $C_3$, $C_4$, $C_5$, and $C_6$ decrease. As an example, the change in the capacitive signals A can be made equal for all signals $S_1$-$S_8$:

$$S_1=S_0+\Delta;$$
$$S_2=S_0+\Delta;$$
$$S_3=S_0-\Delta;$$
$$S_4=S_0-\Delta;$$
$$S_5=S_0-\Delta;$$
$$S_6=S_0-\Delta;$$
$$S_7=S_0+\Delta;$$
$$S_8=S_0+\Delta;$$

Therefore, in case of Z-direction acceleration and no anchor motion, the output signal is:

$$S_{output}=(S_0+\Delta-S_0+\Delta)+(S_0+S_0+\Delta)+(S_0+\Delta-S_0+\Delta)+(S_0+\Delta-S_0+\Delta)=8\Delta.$$

As illustrated in FIG. 10, when accelerometer 1000 undergoes anchor motion, both proof masses 1002 and 1004 rotate about an in-plane axis. Therefore, the two proof mass heads move in opposite directions. The value of the capacitances is determined by the corresponding distances between the corresponding proof mass portions and the corresponding fixed electrodes, therefore, capacitances $C_1$, $C_2$, $C_5$, and $C_6$ decrease, while capacitances $C_3$, $C_4$, $C_7$, and $C_8$ increase. According to the embodiment, the change in the capacitive signals A can be made equal for all signals $S_1$-$S_8$, so that:

$$S_1=S_0-\Delta;S_2=S_0-\Delta;S_3=S_0+\Delta;S_4=S_0+\Delta;S_5=S_0-\Delta;$$
$$S_6=S_0-\Delta;S_7=S_0+\Delta;S_8=S_0+\Delta;$$

According to the embodiment the output signal is the same linear combination of signals $S_1$-$S_8$ as was used to illustrate the case of acceleration $$S_{output}=(S_1-S_4)+(S_2-S_3)+(S_8-S_5)+(S_7-S_6)$$

Therefore, in case of no acceleration, but anchor motion, the output signal is zero $$S_{output}=(S_0-\Delta-S_0-\Delta)+(S_0-\Delta-S_0-\Delta)+(S_0+\Delta-S_0+\Delta)+(S_0+\Delta-S_0+\Delta)=0$$

The fact that output is zero indicates that Z-accelerometer 1000 is insensitive to anchor motion due to sources other than acceleration.

While the various embodiments have been described in connection with the various figures, it is to be understood that other similar embodiments may be used or modifications and additions may be made to the described embodiments for performing the same function without deviating from the spirit of the embodiments. Therefore, the present innovation should not be limited to any single embodiment, but rather should be construed in breadth and scope in accordance with the appended claims.

What is being claimed:

1. An accelerometer, comprising:
   a mechanical structure, comprising:
      a substrate;
      an anchor coupled to the substrate;
      a first proof mass coupled to the anchor by a first flexible member wherein the first proof mass rotates in response to an acceleration of the accelerometer about a first axis; and
      a second proof mass coupled to the anchor by a second flexible member, wherein the second proof mass rotates in response to the acceleration of the accelerometer about a second axis, wherein the first and second axes are co-linear;

a first transducer configured to measure a first distance between a first reference area and a first portion of the first proof mass;

a second transducer configured to measure a second distance between a second reference area and a second portion of the first proof mass;

a third transducer configured to measure a third distance between a third reference area and a first portion of the second proof mass;

a fourth transducer configured to measure a fourth distance between a fourth reference area and a second portion of the second proof mass; and a signal processing circuit coupled to the first transducer, the second transducer the third transducer, and the fourth transducer, the signal processing circuit configured to provide an output related to the acceleration, wherein the first and second flexible members provide torsional compliance about the first axis.

2. The accelerometer of claim 1, wherein the signal processing circuit is operable to produce a first signal proportional to the difference of an output of the first and second transducers and a second signal proportional to the difference of an output of the third and fourth transducers.

3. The accelerometer of claim 2, further wherein the signal processing circuit is operable to determine a difference between the first signal and the second signal proportional to a motion of the first and second proof masses.

4. The accelerometer of claim 1, further comprising a support arm positioned between the anchor and the first and second flexible members.

5. The accelerometer of claim 1, wherein the first proof mass has a positive rotation about the first axis in response to an acceleration and the second proof mass has a negative rotation about the first axis in response to the acceleration.

6. The accelerometer of claim 1, wherein the first and second transducers are located on opposite sides of the first axis and the third and fourth transducers are located in opposite sides of the first axis.

7. The accelerometer of claim 1, wherein the first, second, third, and fourth transducers are positioned between the proof mass and the substrate.

8. The accelerometer of claim 1, wherein the first axis is the x-axis.

9. The accelerometer of claim 1, wherein the first, second, third, and fourth transducers are variable capacitors.

10. The accelerometer of claim 1, wherein the first, second, third and fourth transducers are electrodes or optical electrodes.

11. The accelerometer of claim 1, wherein the mechanical structure is disposed in a plane;

the first proof mass is configured to rotate out of the plane in response to an acceleration normal to the plane;

the second proof mass is configured to rotate out of plane in response to the acceleration normal to the plane;

the first transducer is configured to measure the first distance normal to the plane;

the second transducer is configured to measure the second distance normal to the plane;

the third transducer is configured to measure the third distance normal to the plane; and the fourth transducer is configured to measure the fourth distance normal to the plane.

12. The accelerometer of claim 1, wherein the first and second proof masses rotate in opposing directions, further wherein, the signal processing circuit measures differential motion of the first and second proof masses and rejects common motion of the first and second proof masses.

13. An accelerometer, comprising:
a mechanical structure, comprising:
a substrate;
an anchor coupled to the substrate;
a first proof mass coupled to the anchor by a first flexible member, wherein a force applied to the anchor causes anchor motion and in response to the anchor motion, the first proof mass rotates relative to the substrate;
a second proof mass coupled to the anchor by a second flexible member that rotates in response to the anchor motion relative to the substrate, wherein the first and second proof masses are aligned about a first axis;
a first transducer configured to measure a first distance between a first reference area and a first portion of the first proof mass;
a second transducer configured to measure a second distance between a second reference area and a second portion of the first proof mass;
a third transducer configured to measure a third distance between a third reference area and a first portion of the second proof mass;
a fourth transducer configured to measure a fourth distance between a fourth reference area and a second portion of the second proof mass; and
a signal processing circuit coupled to the first transducer, the second transducer
the third transducer, and the fourth transducer, the signal processing circuit configured to measure the anchor motion, wherein the signal processing circuit produces a first signal proportional to the difference of an output of the first and second transducers and a second signal proportional to the difference of an output of the third and fourth transducers, further wherein the signal processing circuit determines a difference between the first signal and the second signal proportional to the anchor motion of the first and second proof masses,
further wherein the first and second flexible members provide torsional compliance about the first axis.

14. The accelerometer of claim 13, wherein the first proof mass has a positive rotation about the first axis in response to the anchor motion and the second proof mass has a negative rotation about the first axis in response to the anchor motion.

15. The accelerometer of claim 13, wherein the first and second transducers are located on opposite sides of the first axis and the third and fourth transducers are located in opposite sides of the first axis.

16. The accelerometer of claim 13, wherein the first, second, third, and fourth transducers are positioned on top of the substrate.

17. The accelerometer of claim 13, wherein the first and second proof masses move in the same direction, further wherein the signal processing circuit is configured to measure an acceleration and reject the anchor motion.

18. The accelerometer of claim 13, wherein the first axis is the x-axis.

19. The accelerometer of claim 13, further including a support arm rigidly coupled to the anchor, the first proof mass is coupled to the support arm by the first flexible member, and the second proof mass is coupled to the support arm.

* * * * *